(12) United States Patent
De Jonge

(10) Patent No.: US 7,602,475 B2
(45) Date of Patent: Oct. 13, 2009

(54) SYSTEM AND METHOD FOR PROVIDING MODIFIED ILLUMINATION INTENSITY

(75) Inventor: Roel De Jonge, Veldhoven (NL)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 12/141,630

(22) Filed: Jun. 18, 2008

(65) Prior Publication Data

US 2008/0309908 A1 Dec. 18, 2008

Related U.S. Application Data

(62) Division of application No. 11/094,313, filed on Mar. 31, 2005, now Pat. No. 7,403,267.

(51) Int. Cl.
G03B 27/72 (2006.01)
G03B 27/42 (2006.01)
G03B 27/54 (2006.01)
G03B 27/32 (2006.01)
G02B 5/30 (2006.01)

(52) U.S. Cl. ............................. 355/71; 355/53; 355/67; 355/77; 359/494; 359/499

(58) Field of Classification Search .................. 355/53, 355/67, 71, 77; 359/494, 497, 498, 499, 359/501
See application file for complete search history.

(56) References Cited

U.S. PATENT DOCUMENTS 5,279,775 A 1/1994 Thomas et al.
5,420,717 A 5/1995 Tabata
6,680,798 B2 1/2004 Kreuzer
6,987,592 B2 1/2006 Tsukagoshi
7,130,025 B2 10/2006 Tsuji
7,245,353 B2 7/2007 Mulkens et al.

(Continued)

FOREIGN PATENT DOCUMENTS

JP 2000-347137 A 12/2000

(Continued)

OTHER PUBLICATIONS

English Translation of JP 2000-347137 (dated Dec. 15, 2000).*

(Continued)

*Primary Examiner*—Alan A Mathews
(74) *Attorney, Agent, or Firm*—Sterne, Kessler, Goldstein & Fox P.L.L.C.

(57) ABSTRACT

A lithography system including a polarized illumination source, a birefringence-controllable optical element, a birefringence inducer, a pattern generator, a linear polarizer, and a projection system. The polarized illumination source is configured to provide polarized light. The birefringence-controllable optical element is optically coupled to the polarized illumination source. The birefringence inducer is coupled to the birefringence-controllable optical element and configured to induce birefringence on the birefringence-controllable optical element to provide polarization-retarded polarized light. The pattern generator is optically coupled to the birefringence-controllable optical element. The linear polarizer is optically coupled to the pattern generator and configured (i) to receive the polarization-retarded polarized light and (ii) modify intensity distribution of the polarization-retarded polarized light to provide modified polarization-retarded polarized light. The projection system is configured to project the modified polarization-retarded polarized light.

20 Claims, 6 Drawing Sheets

U.S. PATENT DOCUMENTS

| | | |
|---|---|---|
| 7,403,267 B2 | 7/2008 | de Jonge |
| 2002/0027719 A1 | 3/2002 | Kreuzer |
| 2006/0077370 A1 | 4/2006 | Mulkens et al. |

FOREIGN PATENT DOCUMENTS

| | | |
|---|---|---|
| JP | 2004-258063 A | 9/2004 |
| JP | 2004-294756 A | 10/2004 |

OTHER PUBLICATIONS

English Translation of JP 2004-258063 (dated Sep. 16, 2004).*

English Translation of Notice of Reasons for Rejection for Japanese Patent Application No. 2006-084486 mailed Dec. 11, 2008, 4 pgs.

Hecht, Eugene, Optics, Third Edition, Addison-Wesley Longman, Inc., Reading, MA, pp. i-vi and 319-376 (Chapter 8) (1988). cited by other.

"Soleil-Babinet Compensator," Cleveland Crystals, Inc., Highland Hts., OH, <http://www.clevelandcrystals.com/sbc.shtml>, 4 pages (visited Nov. 9, 2004). cited by other.

"Soleil-Babinet Compensator and Divided-Circle Rotating Mount," Melles Griot, <http://www.mellesgriot.com/pdf/0012.28.pdf>, 1 page (visited prior to Mar. 1, 2005). cited by other.

* cited by examiner

SYSTEM AND METHOD FOR PROVIDING MODIFIED ILLUMINATION INTENSITY

CROSS REFERENCE TO RELATED APPLICATIONS

This application is a divisional of U.S. patent application Ser. No. 11/094,313 to Roel De Jonge, entitled "System and Method for Providing Modified Illumination Intensity" and filed Mar. 31, 2005, now allowed, the entirety of which is incorporated by reference herein.

BACKGROUND

1. Field

The present invention is related to illumination intensity uniformity compensators.

2. Related Art

Uniformity compensators (also known as UniComs, by those skilled in the relevant art) are used in many systems, including lithography systems, for example, to provide an illumination intensity distribution that is as close as possible to a desired illumination intensity distribution. In lithography, for example, a uniform illumination intensity is desired at the substrate level. A uniformity compensator can be located in a lithography system (at an illuminator or slit, for example) to compensate for effects introduced by the projection optics. In one example, an optimal uniformity distribution provided by a uniformity compensator can be a certain non-uniform distribution.

Some previous uniformity compensators used in lithography systems compensate via gray filters, for example, for low frequency uniformity variations over the slit. This can result in non-uniformity with an undesirable high frequency variation component. In addition, some currently known uniformity compensators and compensation methods have a negative impact on dose quantization due to changing of the effective slit width and/or the number of pulses in the slit. For example, some lithography systems can compensate for higher frequencies using a finger array moving from the side into the slit. However, these systems alter the slit width and number of laser pulses in the slit locally, depending on the position of each finger. Furthermore, the illumination intensity distribution requirement for modern lithography systems is tightening. Modern lithography systems currently require illumination intensity distribution variation of less than about 0.1%.

Therefore, what is needed is an illumination intensity uniformity compensator that can compensate for high frequencies and does not substantially affect the dose quantization. What is also needed is an illumination intensity uniformity compensator that does not affect the effective slit width and allows the number of pulses in the slit to remain unchanged.

SUMMARY

An embodiment of the present invention provides a system for providing a modified illumination intensity distribution of polarized light that includes a birefringence-controllable optical element. The system also includes a birefringence inducer and a linear polarizer, both coupled to the birefringence-controllable optical element. The birefringence inducer induces or changes birefringence in the birefringence-controllable optical element in order to provide polarization retardation in a light beam passing through the birefringence-controllable optical element. The linear polarizer filters the polarization of the light beam to produce a linear polarized modified intensity light beam.

In some embodiments, the optical element can include a birefringence-controllable optical plate or an array of birefringence-controllable optical plates. In embodiments using one or more optical plates, the birefringence inducer can include an external force generator. The external force generator can include a mechanical force generator, an electrical field generator, a magnetic field generator, or an acoustic wave generator, for example. In alternative embodiments, the optical element can be a birefringence-controllable adjustable optical compensator, such as a commercially available Soleil-Babinet Compensator (SBC).

Some embodiments include a control system that controls the inducement of birefringence by the birefringence inducer, thereby controlling the illumination intensity of the output of the linear polarizer. The control system can include an intensity detector and controller, and can provide a control signal to the birefringence inducer.

An embodiment of the present invention provides a method of providing a modified illumination intensity distribution of polarized light, including the steps of transmitting a polarized light beam to a birefringence-controllable optical element, adjusting birefringence of the birefringence-controllable optical element to produce a polarization-retarded light beam, and linearly polarizing the polarization-retarded light beam to produce a linear polarized modified intensity light beam. In one embodiment, the adjusting step includes applying an external force on the birefringence-controllable optical element, such as a mechanical, electrical, magnetic, or acoustical force. In some embodiments, the method further includes controlling the linear polarized modified intensity light beam. In an embodiment, the method can include detecting illumination intensities of the linear polarized modified intensity light beam, generating a control signal based on the detected illumination intensities, and performing the adjusting step based on the control signal.

A further embodiment of the present invention includes a lithography system that includes a polarized illumination source, a birefringence-controllable optical element optically coupled to the polarized illumination source, and a birefringence inducer coupled to the birefringence-controllable optical element. The system also includes a pattern generator optically coupled to the birefringence-controllable optical element, a linear polarizer optically coupled to the pattern generator, and a projection system optically coupled to the linear polarizer that can project a light beam onto an object, such as a work piece. In an embodiment, the lithography system further includes a control system.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate one or more embodiments of the present invention and, together with the description, further serve to explain the principles of the invention and to enable a person skilled in the pertinent art to make and use the invention.

Figure 1:
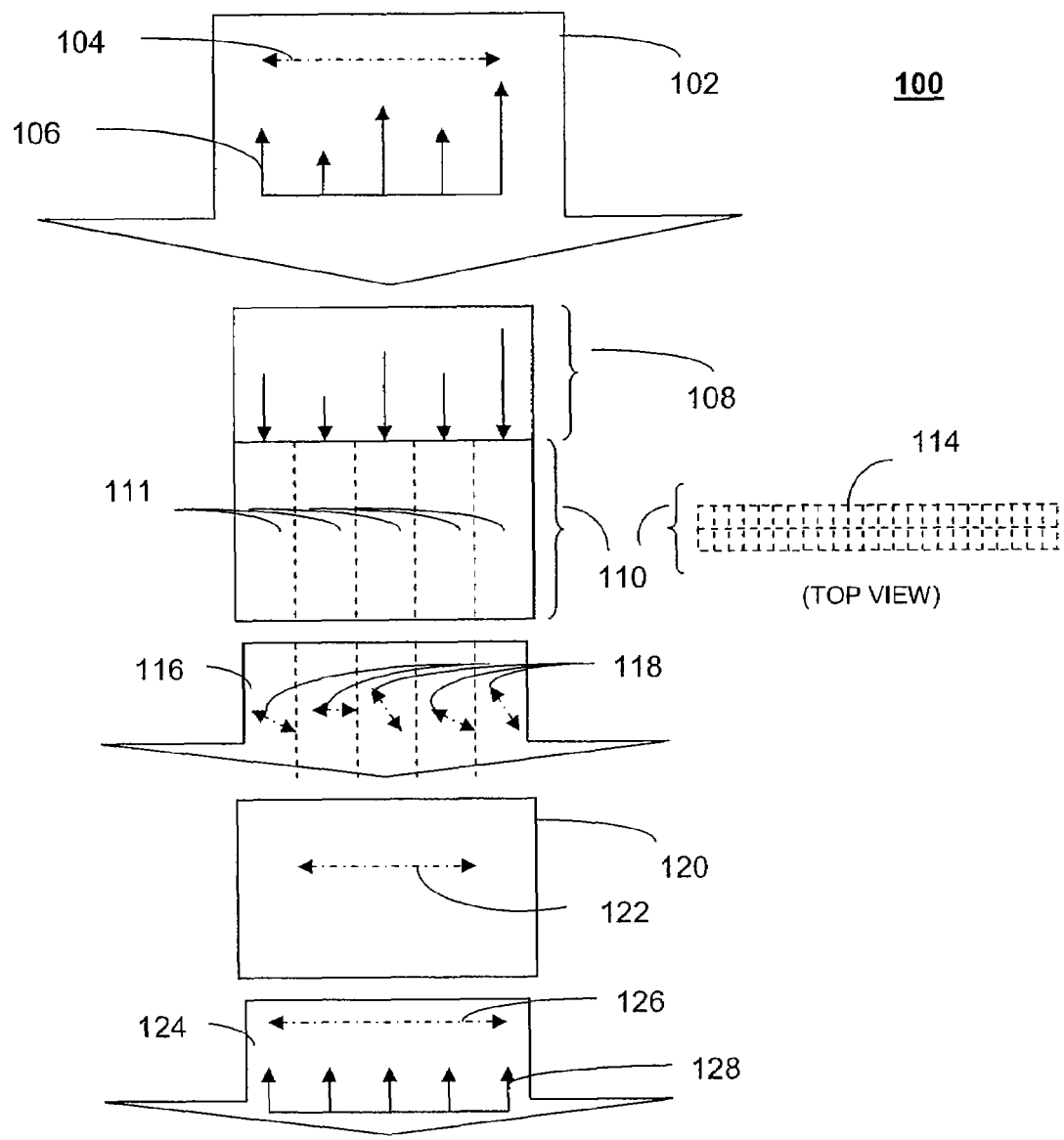
FIG. 1 depicts an illumination intensity uniformity compensator, according to embodiments of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Embodiments of the present invention provide a system and method for providing a modified illumination intensity distribution in a polarized light beam utilizing a birefringence-controllable optical element upon which birefringence is induced to change an index of refraction within the optical element. The optical element can be made from an optically anisotropic material, which is a material that exhibits optical properties with different values when measured in different directions. Many crystalline substances, for example, are optically anisotropic. Other materials are not optically anisotropic in their normal state, but can have optically anisotropic properties induced in them. Birefringence is one such optically anisotropic property. The optical element can alternatively be made from such a non-optically-anisotropic material.

Birefringence is the refraction of light in two slightly different directions to form two rays. In other words, a birefringent material is one that displays at least two different indices of refraction. Inducing, or changing, the birefringence of an optical element made from a birefringent material changes the indices of refraction in the optical element. A change in an index of refraction imparts a change to the optical performance of the optical element, such that the illumination intensity of a beam of polarized radiation can change as it passes through the optical element and a subsequently placed polarizer. Individually adjusting variable illumination intensities within a light beam in this manner can result in a light beam of more uniform illumination intensity. In a lithography system, for example, this technique can be used to compensate for effects on illumination intensity introduced by projection optics, which provides a light beam of more uniform illumination intensity to a workpiece.

The Physics Behind Birefringence

An understanding of the physics behind birefringence may be helpful in reading the following invention description. The information found in the following paragraphs was taken from Hecht, Eugene, *Optics*, Addison-Wesley, Reading, Mass., Third Edition, Chapter 8, pages 319-376, Copyright 1998 by Addison Wesley Longman, Inc, which is incorporated herein by reference in its entirety.

Some materials, such as cubic crystals, are optically isotropic. These materials have a single index of refraction and are not birefringent in their normal state. Other materials, such as hexagonal, tetragonal, and trigonal crystals are anisotropic and birefringent because their atoms are arranged such that light is incident upon an asymmetric structure. Crystals in which there is only one optic axis (i.e., only one direction in which atoms are symmetrically arranged) are uniaxial crystals. Uniaxial substances have two principle indices of refraction. One refractive index, $n_o$, corresponds to the natural spherical o-wavelets radiated from the material, and is represented by the equation $n_o \equiv c/v\perp$, where c is the speed of light and $v\perp$ is the speed with which the spherical o-wavelets expand. The other refractive index, $n_e$, corresponds to the natural ellipsoidal e-wavelets radiated from the material, and is represented by the equation $n_e \equiv c/v\|$, where $v\|$ is the speed with which the e-wavelets expand normal to the optic axis. Birefringence is equal to the difference $\Delta n = n_e - n_o$. With two indices of refraction, a light beam through the crystal will become two orthogonal beams. (See Hecht, sections 8.4, 8.4.1, and 8.4.2, on pages 330-338.) (There are other crystals, such as orthorhombic, monoclinic, and triclinic crystals, that are biaxial (i.e., have two optic axes) and have three different indices of refraction. (See Hecht, section 8.4.2, page 338.) However, the properties of these biaxial crystals will not be discussed here.)

As described later in this document, optical effects, such as birefringence, can be induced in an optical element even if the optical element is made from a material that is not optically anisotropic in its normal state. In materials that are optically anisotropic, the birefringence can be changed by this inducement. The means used to induce birefringence can be, for example, mechanical, acoustical, electrical, or magnetic means. The physics behind some of these means will now be briefly described.

The application of mechanical stress on a substance can induce, or change, birefringence in that substance. This mechanical birefringence is also known as stress birefringence or photoelasticity. Mechanical birefringence can be obtained through, for example, applying compression or tension on the substance. The application of mechanical stress creates an effective optic axis in the direction of the stress. The induced birefringence is proportional to the stress. The resulting birefringence is not uniform if the applied stress is not uniform. With such non-uniformity, the retardance of a transmitted wave is also not uniform. The retardance at any location in the substance is proportional to the principal stress difference $(\sigma_1 - \sigma_2)$, where $\sigma_1$ and $\sigma_2$ are orthogonal principal stresses (e.g., vertical and horizontal stresses). The principal stresses (and their differences) can vary at different areas of a substance. (See Hecht, section 8.11.1, on pages 360-362.)

The application of a magnetic field can also induce, or change, birefringence in a substance. When a strong magnetic field is applied in the propagation direction of linear light incident on a material, the plane of vibration of the light will rotate. This is called the Faraday Effect. The angle (in minutes of arc) through which the plane of vibration rotates is $\beta = \mathcal{V} Bd$, where B is the static magnetic flux density, d is the length of the medium traversed, and $\mathcal{V}$ is the Verdet constant of the material. Because of this effect, magnetic fields have been used in the making of optical modulators. (See Hecht, section 8.11.2, on pages 362-363.)

The application of an electric field can also induce, or change, birefringence in a substance. When an electric field is applied, two indices of refraction can result. One index of refraction, n∥, corresponds to the orientation of the plane-of-vibration of the wave that is parallel to the applied electric field. The other index of refraction, n⊥, corresponds to the orientation of the plane-of-vibration of the wave that is perpendicular to the applied electric field. Birefringence is equal to the difference between n∥ and n⊥. $\Delta n = \lambda_0 K E^2$, where $\lambda_0$ is the wavelength, E is the electric field, and K is the Kerr constant of the substance. This phenomenon is known as the Kerr Effect. The Kerr Effect is proportional to the square of the electric field and is sometimes called the quadratic electro-optical effect. (See Hecht, section 8.11.3, on pages 363-364.)

Another electro-optical effect is the Pockels Effect. As opposed to the quadratic electro-optical Kerr Effect, the Pockels Effect is a linear electro-optical effect. With the Pockels Effect, the induced birefringence is proportional to the first power of the applied electrical field, and therefore is proportional to the applied voltage. This effect only occurs in materials that do not have a center of symmetry. (See Hecht, section 8.11.3, on pages 364-366.)

For more information on birefringence generally and/or ways to induce optical effects, see Hecht, Eugene, *Optics*, Addison-Wesley, Reading, Mass., Third Edition, Chapter 8, pages 319-376, Copyright 1998 by Addison Wesley Longman, Inc, which, as stated earlier, is incorporated herein by reference in its entirety.

Exemplary Uniformity Compensators

Figure 2:
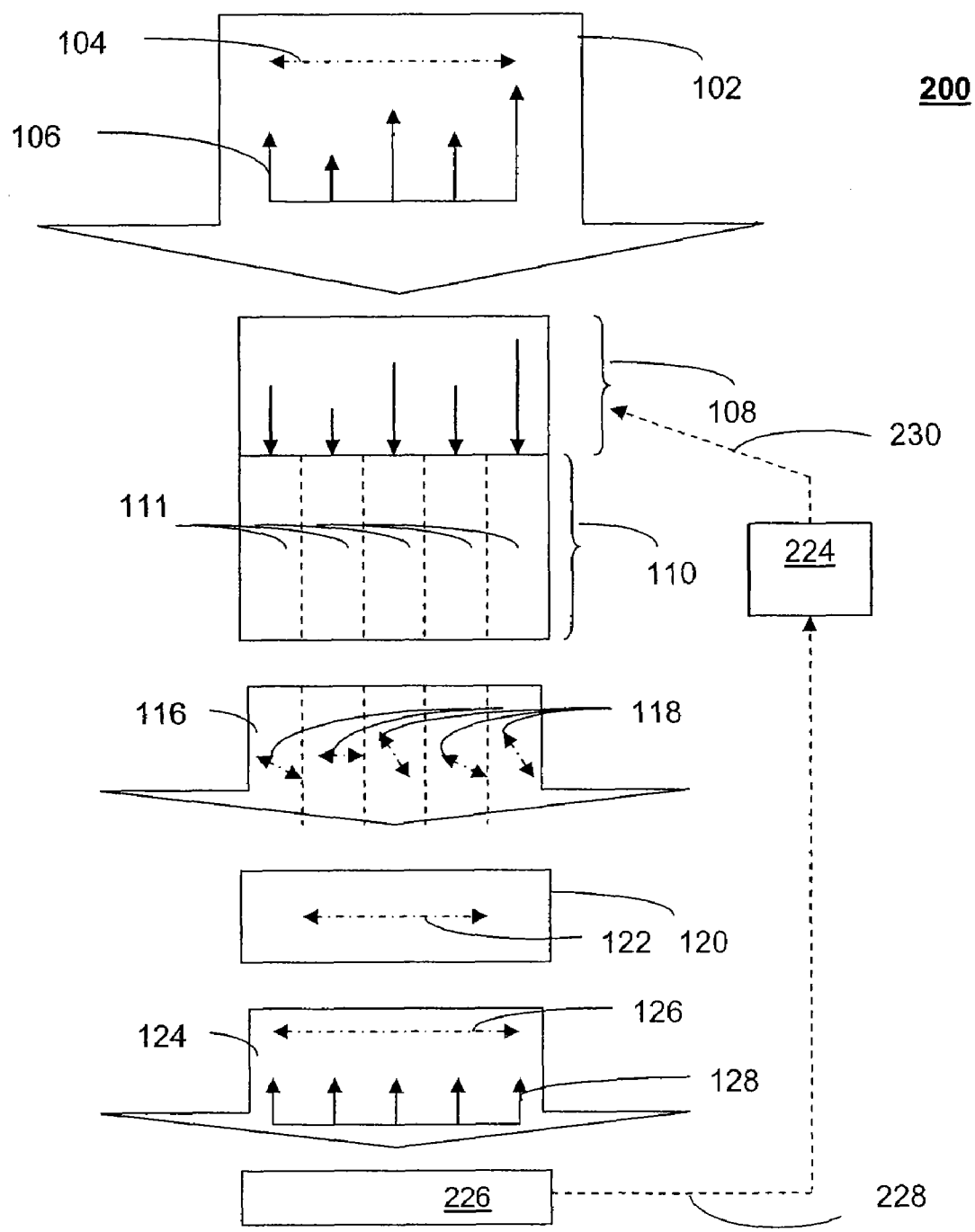
FIG. 2 depicts an illumination intensity uniformity compensator with a control system, according to an embodiment of the present invention.

FIGS. 1 and 2 depict an example uniformity compensator system, according to various embodiments of the present invention. The uniformity compensator system of FIG. 2 is similar to that of FIG. 1, but further includes a control system, as will be later discussed.

FIG. 1 shows system 100 that includes an optical element 110, a birefringence inducer 108, and a polarizer 120. Optical element 110 can comprise one or more birefringence-controllable optical sub-elements 111, such as birefringence-controllable optical plates or adjustable optical compensators. For example, optical element 110 can comprise an array of optical plates or an array of adjustable optical compensators. In FIG. 1, an array of five optical sub-elements 111 is illustrated for simplicity. However, an array of any size can be used, such as array 114, shown as a top view, which comprises a two-by-twenty-four (2×24) array of optical sub-elements. An array can be a finger-type array, as would be known by those skilled in the relevant art.

The birefringence-controllable material used to form optical element 110 should be a material that is optically active under physical stress or under electric or magnetic fields, for example. In one example, optical element 110 is made from Calcium Fluoride ($CaF_2$). Calcium Fluoride ($CaF_2$) is a birefringent material in its normal state, in which case birefringence can be induced upon it to correct or change the properties of light passing through it. In another example, optical element 110 is made from Silicon Dioxide ($SiO_2$). Silicon Dioxide ($SiO_2$) is not birefringent in its normal state, but birefringence can be induced. Other optically active materials can also be used, as discussed below, and as would be recognized by those of skill in the relevant art.

In embodiments in which optical element 110 is an array of optical plates, the plates should be placed as close together as possible, and can even be placed as to slightly overlap. The size of the optical plates can be on the order of millimeters. In an example two-by-twenty-four (2×24) array, such as array 114, optical plates of about 3 mm to about 5 mm can be used. The more plates used, and the smaller the plates, the more uniform the resulting illumination intensity profile. As stated earlier, the array of optical plates can be of any size.

The birefringence inducer 108 optionally forms part of the optical sub-elements 111, as when using adjustable optical compensators such as Soleil-Babinet Compensators described below, for example. In the alternative, the birefringence inducer 108 is external to the optical sub-elements 111.

Optical element 110 receives a polarized illumination beam 102 with polarization 104 and illumination intensity profile 106, for example. In an embodiment, polarized illumination beam 102 is linearly polarized. In other embodiments, polarized illumination beam 102 is partly polarized (e.g., elliptically polarized). As shown in FIG. 1, illumination intensity profile 106 shows variability of illumination intensity in illumination beam 102. In order to obtain a desired illumination intensity profile, birefringence can be induced on the one or more optical sub-elements 111 using the birefringence inducer 108. This introduces locally varying retardation of the light beam polarization as a function of the locally induced birefringence. A subsequently placed polarizer 120 can remove light intensity, also as a function of the locally induced birefringence.

In an embodiment, birefringence is induced by applying external forces on each of the optical sub-elements 111 individually. Thus, the singular term "birefringence inducer 108" as used herein also encompasses plural birefringence inducers as there can be a birefringence inducer 108 for each optical sub-element 111. The more stress applied to an optical sub-element 111, the more birefringence, and the more retardation in polarization. Therefore, in this example, the most stress should be applied to the optical sub-element 111 associated with the highest illumination intensity in order to create more polarization-retardation. In this manner, the polarization-retardation of the portion of the illumination beam passing through each optical sub-element 111 is individually adjusted.

As a result of the stress-induced birefringence on optical element 110, the output beam 116 as output from optical element 110 has retarded polarizations 118 that are rotated from the polarization 104 of the original illumination beam 102. Output beam 116 is then passed through a polarizer 120 with polarization 122, in order to filter out any unwanted polarization and intensity. The resulting beam 124 is then of polarization 126 (the polarization 122 of polarizer 120). If polarized illumination beam 102 is a linear polarized illumination beam, a most uniform (equally distributed) intensity distribution can be obtained by applying a retardation angle of a polarization vector equal to $\alpha = \arcsin(I_o/I_i)$, where $I_i$ is the starting local intensity on a portion of output beam 116, and $I_o$ is the desired local intensity. In this case, resulting beam 124 has uniform illumination intensity profile 128.

According to embodiments in which optical element 110 is an array of optical plates, birefringence inducer 108 includes mechanical means, such as, for example, means for bending, compressing, applying tension to, or pushing on the optical plates. In alternative embodiments using an array of optical plates, birefringence inducer 108 includes electrical means, such as, for example, means for applying an electric field. In further embodiments, birefringence inducer 108 includes magnetic means (e.g., means for applying a magnetic field) or acoustical means (e.g., means for applying an acoustic wave). The example embodiments of birefringence inducer 108 presented here are by way of example only, and not limitation. Other birefringence inducers 108 will be apparent to persons skilled in the relevant art without departing from the spirit and scope of the invention.

In embodiments that induce birefringence mechanically on optical plates, each optical plate can be held within the system, for example, by being mounted on two sides (e.g., clamping the top and bottom), such that the optical path is not blocked. Mechanical stress can be uniformly placed, for example, on one side or on opposing sides, depending on the mechanical means used. In other embodiments, the optical plates can be mounted in other ways. For example, in embodiments that induce birefringence electrically or magnetically, an electric or magnetic field can be applied on the optical plates from a device mounted elsewhere such that the manner of mounting the optical plates can be accomplished in many acceptable ways, keeping the optical path free, as would be recognized by those skilled in the relevant art.

As stated earlier, an embodiment includes a control system to detect the illumination intensities of polarizer output beam 124 and adjust the induced birefringence accordingly. For example, system 200 of FIG. 2 includes all of the same elements found in FIG. 1, and further includes a control system that includes intensity detector 226 and controller 224.

Intensity detector 226 can detect the illumination intensities from output beam 124 that correspond to each individual optical sub-element 111, for example. The detected intensities are transmitted to controller 224 via feedback signal 228. In response to feedback signal 228, controller 224 transmits control signal 230 to birefringence inducer 108. Birefringence inducer 108 accordingly adjusts the birefringence of each individual optical sub-element 111 under control of control signal 230.

According to some embodiments, optical element 110 includes an array of birefringence-controllable adjustable optical compensators through which birefringence is induced. Similar to an array of optical plates, an array of adjustable optical compensators can be of any size. An adjustable optical compensator can include an adjustable waveplate or retardation plate made of a birefringence-controllable material. An adjustable optical compensator can also include its own adjuster to adjust birefringence. An example of an adjustable optical compensator is the commercially available Soleil-Babinet Compensator (SBC), use of which will now be described.

Figure 3:
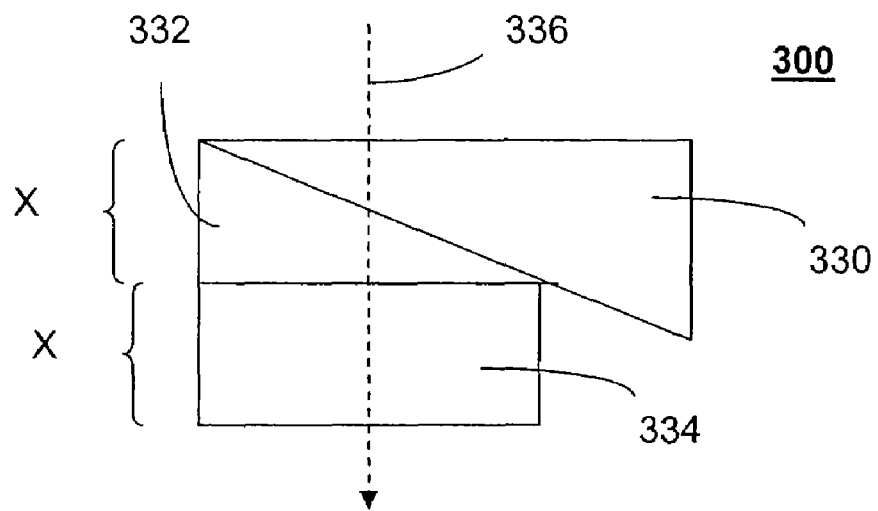
FIGS. 3 and 4 depict different states of an adjustable optical compensator, such as a Soleil-Babinet Compensator (SBC).
Figure 4:
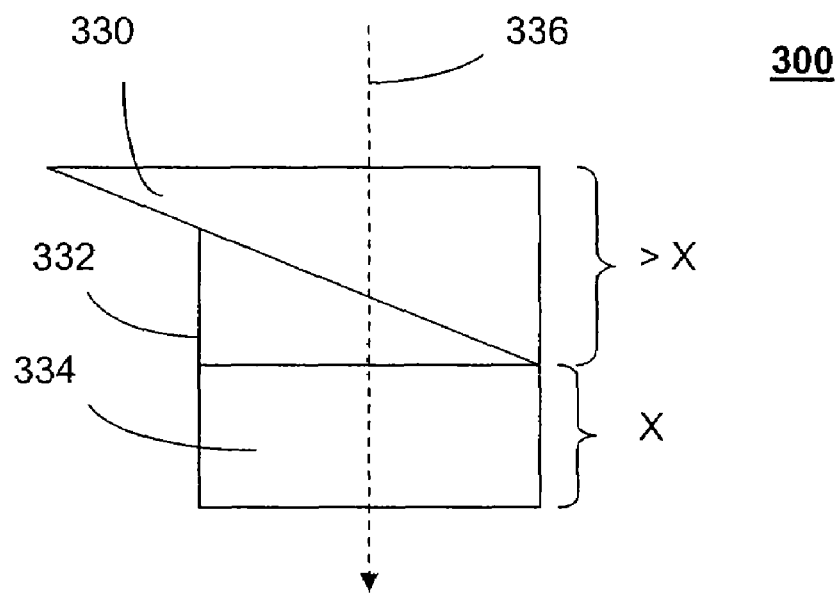

FIGS. 3 and 4 show examples of different states of a Soleil-Babinet Compensator (SBC), shown as an example of an adjustable optical compensator. Soleil-Babinet Compensator 300 includes a movable long wedge 330, a fixed short wedge 332 having the same angle as long wedge 330, and fixed plate 334. As shown in FIGS. 3 and 4, long wedge 330 and short wedge 332 are placed in parallel such that their hypotenuses face each other. Long wedge 330 and short wedge 332 are usually separated by a small air space (not shown). Fixed plate 334 is placed below fixed short wedge 332, as shown. Long wedge 330 and short wedge 332 can be made from birefringence-controllable materials, such as crystalline quartz, Magnesium Fluoride (MgF$_2$), Cadmium Sulphide (CdS), or Cadmium Selenide (CdSe), for example, or any other birefringence-controllable materials. Long wedge 330 and short wedge 332 can each be made from the same material or different material.

Fixed plate 334 can also be made of the same material or different material as that of either (or both) of the long wedge 330 and short wedge 332. However, fixed plate 334 should have an optic axis orthogonal to that of the wedge pair. In an alternative embodiment that does not use a fixed plate 334, long wedge 330 should have an optic axis orthogonal to that of short wedge 332 (i.e., one wedge should be oriented in the optical active direction, and the other wedge should be oriented in the optical passive direction). However, in this alternative embodiment, polarization retardation will typically not be uniform.

Retardation of polarization is altered and a change in birefringence occurs in Soleil-Babinet Compensator 300 by moving long wedge 330 in a direction perpendicular to a light beam 336 and along the axis created by the adjacent hypotenuses of wedges 330 and 332. When movable long wedge 330 is placed so that the effective plate formed by long wedge 330 and short wedge 332 is at its minimum thickness, which is the same thickness (X) as fixed plate 334 as shown in FIG. 3, minimum (i.e., little or no) retardation occurs. Alternatively, when movable long wedge 330 is placed so that the effective plate formed by long wedge 330 and short wedge 332 is at its maximum thickness (which is greater than thickness X of fixed plate 334, as shown in FIG. 4), maximum retardation occurs. In this configuration, maximum birefringence is induced, which has the effect of reducing the illumination intensity of the light beam through the Soleil-Babinet Compensator 300. A range of polarization retardation (and induced birefringence) exists for locations of movable long wedge 330 in-between these two extremes.

As stated earlier, adjustable optical compensators can include adjusters to adjust the location of long wedge 332, and therefore adjust birefringence. For example, a Soleil-Babinet Compensator can include a mechanism to move long wedge 330 to different locations in relation to short wedge 332, as discussed above. The Soleil-Babinet Compensator can include, for example, a spring-loaded stage on which long wedge 330 is mounted, which can be moved by a digital micrometer or micrometer screw, for example.

Exemplary Operation

Figure 5:
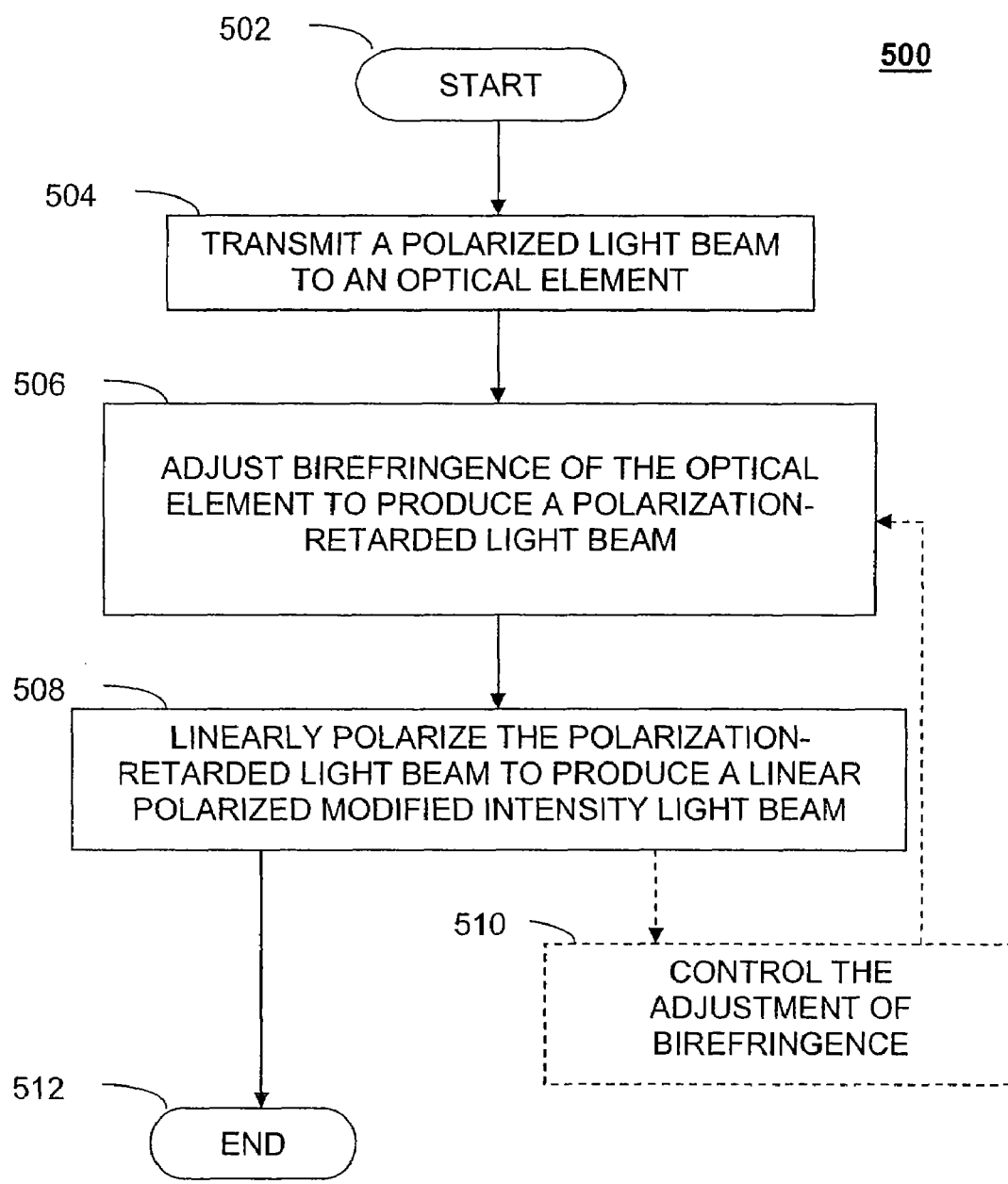
FIG. 5 is a flowchart depicting a method of providing a modified illumination intensity distribution of polarized light, according to embodiments of the present invention.

FIG. 5 is a flowchart depicting a method 500, according to an embodiment of the present invention. Method 500 can be used during operation of systems 100 and 200, or other similar systems.

Method 500 begins at step 502. In step 504, substantially all of a polarized light beam is transmitted to a birefringence-controllable optical element. In step 506, birefringence of the optical element is adjusted to produce a polarization-retarded light beam. The adjustment can be made, for example, via means described elsewhere in this document. The polarization-retarded light beam has a retarded polarization due to passage through the optical element. In step 508, the polarization-retarded light beam is linearly polarized to produce a linear polarized modified intensity light beam. The polarization in step 508 filters out unwanted polarization and intensity. The method concludes at step 512.

Figure 6:
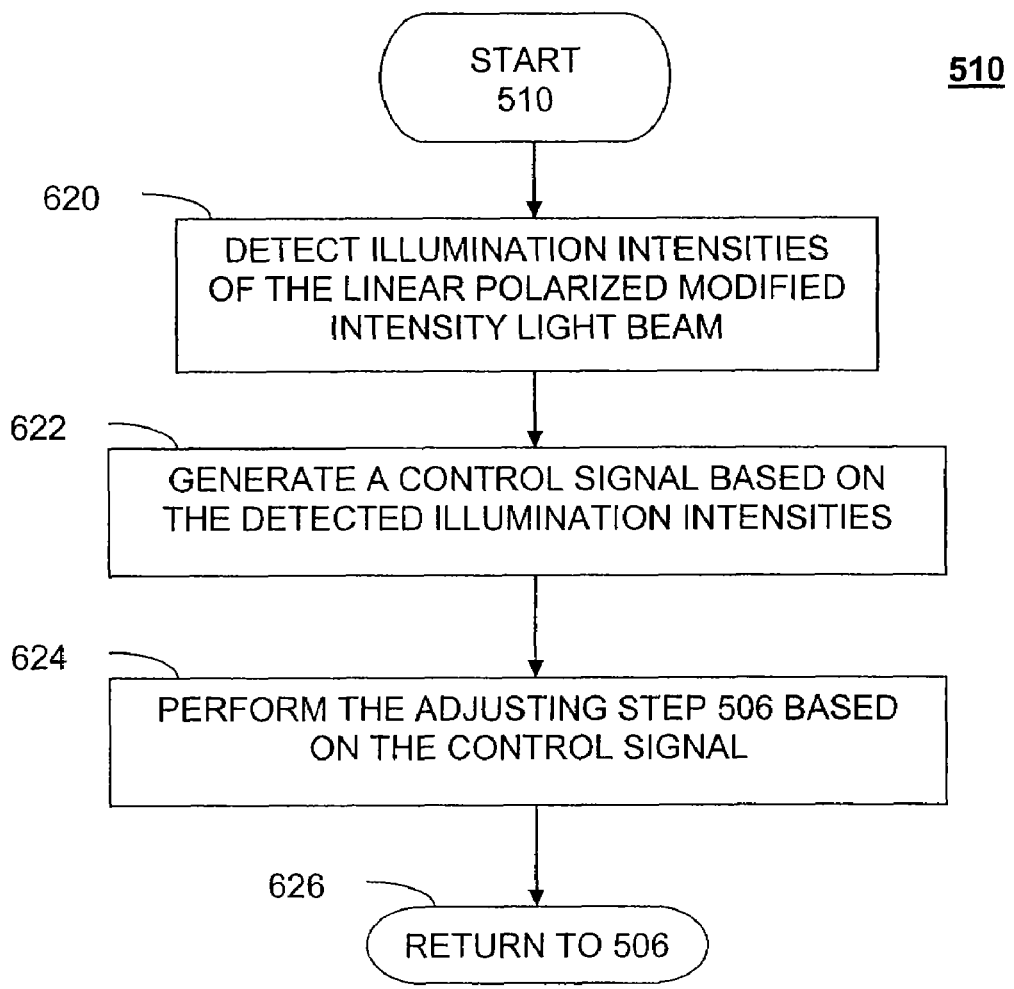
FIG. 6 is a flowchart depicting step 508 of the method depicted in FIG. 5, according to an embodiment of the present invention.

An alternative embodiment includes step 510, shown by dashed lines in FIG. 5. In step 510, the adjustment of birefringence is controlled. In one embodiment, step 510 includes the steps as depicted in FIG. 6. In step 620, illumination intensities of the linear polarized modified intensity light beam are detected. In step 622, a control signal is generated based on the detected illumination intensities. In step 624, the control signal is used to control the adjusting in step 506. In step 626, the method returns to step 506 of method 500. In this manner, the illumination intensity of the resulting light beam after it passes through the linear polarizer can be controlled. If any portion of the light beam that has passed through the linear polarizer is not of a desired intensity, step 510 can adjust it accordingly.

Exemplary Environment Lithography

Figure 7:
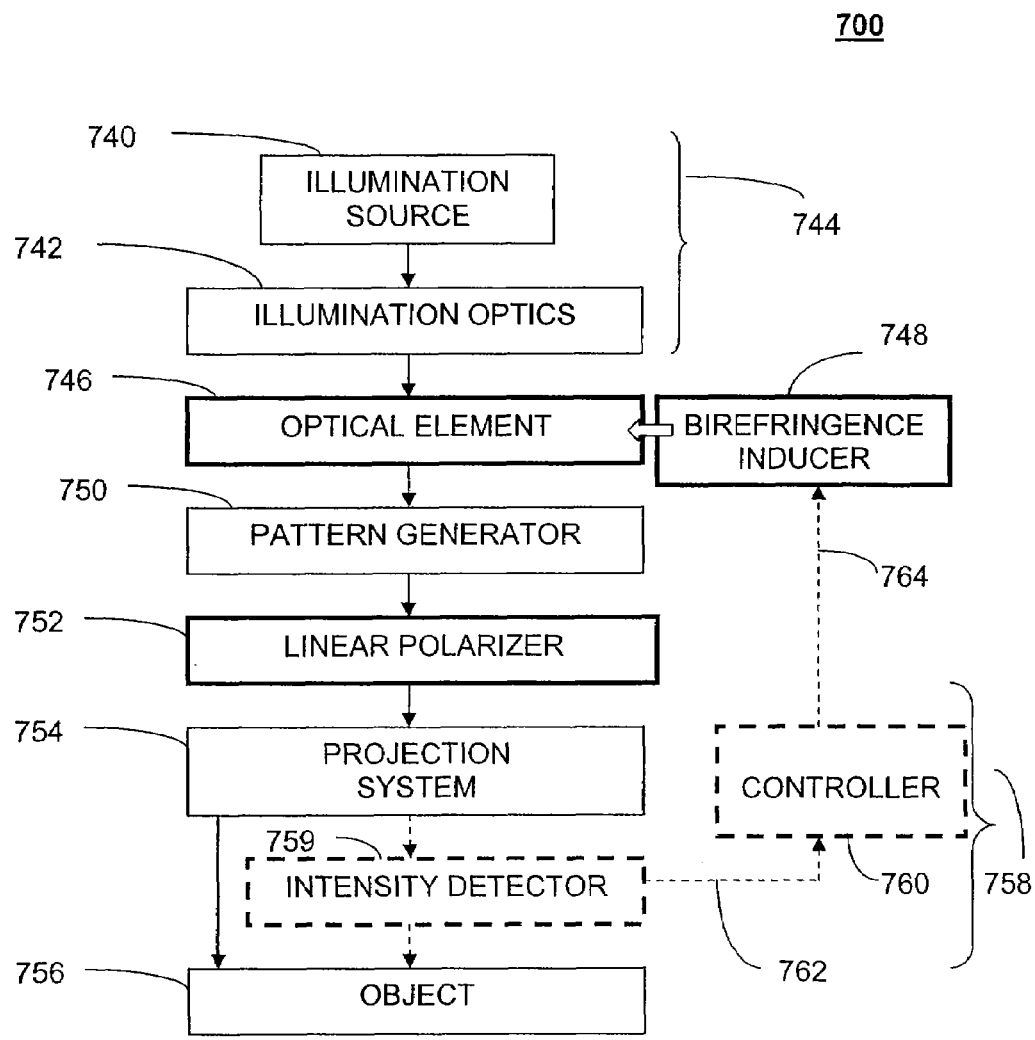
FIG. 7 depicts a lithography system that includes an illumination intensity uniformity compensator, according to embodiments of the present invention.

FIG. 7 shows an example lithography system 700 having a uniformity compensator therein, according to embodiments of the present invention. In FIG. 7, radiation from a polarized illumination system 744 illuminates a pattern generator 750 to produce patterned light, which is directed from pattern generator 750 toward an object 756 via a projection system 754. In various embodiments, object 756 is, but is not limited to, a work piece, a substrate, a wafer, a flat panel display substrate, a print head, micro or nano-fluidic devices, or the like.

As is known, polarized illumination system 744 can include a light source 740 and illumination optics 742. Pattern generator 750 can also include optics (not shown). One or both of these optics can include one or more optical elements (not shown) (e.g., lenses, mirrors, etc.) as would be apparent to those of ordinary skill in the relevant art.

In various examples, pattern generator 750 can be a mask-based or maskless pattern generator, as would become apparent to one of ordinary skill in the art. The masked-based or maskless pattern generator can be associated with lithography, photolithography, microlithography, or immersion lithography, for example.

The uniformity compensator shown in example lithography system 700 includes birefringence-controllable optical element 746, birefringence inducer 748, and linear polarizer 752, as discussed above in regard to FIGS. 1-6. Depending on the use of the uniformity compensator, the uniformity compensator can be positioned in various parts of lithography system 700. In the example of lithography system 700 of FIG. 7, the uniformity compensator is shown with optical element 746 prior to the pattern generator 750, and polarizer 752 is shown after pattern generator 750. The polarized illumination system 744 is optically coupled to birefringence-controllable optical element 746, which is optically coupled to pattern generator 750, which is optically coupled to linear polarizer 752, which is optically coupled to projection system 754, which is optically coupled to object 756. Birefringence inducer 748 is coupled to birefringence-controllable optical element 746. This configuration allows for a more uniform illumination intensity distribution over the pattern generator. The example embodiment of lithography system 700 having a uniformity compensator therein as presented here is by way of example only, and not limitation. Other embodiments will be apparent to persons skilled in the relevant art without departing from the spirit and scope of the invention. For example, optical element 746 can be located inside of illumination system 744, such as part of illumination optics 742.

In one embodiment, an optional control system 758 can be used to make adjustments to birefringence-controllable optical element 746. Control system 758 includes an intensity detector 759 and controller 760. Intensity detector 759, controller 760, and birefringence inducer 748 are coupled in a feedback loop. During operation of this embodiment, intensity detector 759 detects illumination intensities from an output beam exiting projection system 754. The detected intensities are transmitted to controller 760 via feedback signal 762. In response to feedback signal 762, controller 760 transmits control signal 764 to birefringence inducer 748 associated with optical element 746. The birefringence inducer 748 can use control signal 764 to accordingly adjust the birefringence of optical element 746. The optional control system 758 in lithography system 700 as presented here is by way of example only, and not limitation. Other embodiments will be apparent to persons skilled in the relevant art without departing from the spirit and scope of the invention. For example, intensity detector 759 can be located in various positions within lithography system 700, such as immediately following linear polarizer 752.

CONCLUSION

As described above, embodiments of the present invention provide a system and method utilizing a birefringence-controllable optical element upon which birefringence is induced to change an index of refraction within the optical element. The change in the index of refraction imparts a change to the optical performance of the optical element, such that the illumination intensity of a polarized beam of radiation changes as it passes through the optical element and subsequently placed polarizer. Individually adjusting variable illumination intensities within a light beam using this technique can result in a light beam of more uniform illumination intensity and/or an intensity distribution closely matching a desired intensity distribution.

Further embodiments of this invention are possible. For example, optical element 110 can include a single optical plate. In this embodiment, a variable static force field (e.g., birefringence inducer 108) can be applied to the single optical plate to variably induce birefringence. A control system similar to the one described herein can be used to control the variable static force field. As another example of a further embodiment, two-dimensional uniformity correction is provided using a second, ninety-degree (90°) rotated, set of optical plates or adjustable optical compensators. One set can be used for uniformity correction in the left-to-right direction, and another set can be used for uniformity correction in the top-to-bottom direction.

The present invention can provide correction for high frequency variation. Additionally, the present invention can have little or no effect on dose quantization (i.e., there is no change of effective slit width, and the number of pulses in the slit remains the same). The invention can be implemented in a relatively small space with few or no moving parts. In addition, the invention can be implemented with a virtually unlimited number of optical plates that can be placed very close together.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor, and thus, are not intended to limit the present invention and the appended claims in any way.

What is claimed is:

1. A lithography system, comprising:
   a polarized illumination source configured to provide polarized light;
   a birefringence-controllable optical element optically coupled to the polarized illumination source;
   a birefringence inducer coupled to the birefringence-controllable optical element and configured to induce birefringence on the birefringence-controllable optical element to provide polarization-retarded polarized light;
a pattern generator optically coupled to the birefringence-controllable optical element;
a linear polarizer optically coupled to the pattern generator and configured to (i) receive the polarization-retarded polarized light and (ii) modify intensity distribution of the polarization-retarded polarized light to provide modified polarization-retarded polarized light; and
a projection system configured to project the modified polarization-retarded polarized light.

2. The system of claim 1, wherein the birefringence-controllable optical element comprises an array of birefringence-controllable optical plates.

3. The system of claim 2, wherein the birefringence inducer comprises an external force generator.

4. The system of claim 3, wherein the external force generator is a mechanical force generator.

5. The system of claim 3, wherein the external force generator is an acoustic wave generator.

6. The system of claim 3, wherein the external force generator is an electric field generator electromagnetically coupled to the birefringence-controllable optical element.

7. The system of claim 3, wherein the external force generator is a magnetic field generator magnetically coupled to the birefringence-controllable optical element.

8. The system of claim 1, wherein the birefringence-controllable optical element comprises an array of birefringence-controllable adjustable optical compensators.

9. The system of claim 1, further comprising:
a control system coupled to the linear polarizer and the birefringence inducer.

10. The system of claim 9, wherein the control system comprises:
a detector optically coupled to the linear polarizer that receives an output beam from the linear polarizer and detects illumination intensities of the output beam; and
a controller coupled to the detector and the birefringence inducer that generates a control signal from the detected illumination intensities and transmits the control signal to the birefringence inducer.

11. The system of claim 1, wherein the birefringence-controllable optical element comprises a single birefringence-controllable optical plate.

12. The system of claim 11, wherein the birefringence inducer comprises a variable static force field generator.

13. A method of device manufacturing comprising:
producing a polarized light beam;
retarding polarization of the polarized light beam;
generating a pattern of the polarization-retarded light beam;
linearly polarizing the polarization-retarded light beam to produce a linear polarized modified intensity light beam of the pattern; and
projecting the linear polarized modified intensity light beam onto a target portion of a substrate.

14. The method of claim 13, wherein the producing the polarized light beam comprises producing a linearly polarized light beam.

15. The method of claim 13, wherein the retarding polarization of the polarized light beam comprises adjusting birefringence of a birefringence-controllable optical element.

16. The method of claim 15, wherein the adjusting comprises applying an external force on the birefringence-controllable optical element.

17. The method of claim 15, wherein the adjusting comprises individually adjusting birefringence of birefringence-controllable optical plates of an array of birefringence-controllable optical plates that make up the birefringence-controllable optical element.

18. The method of claim 13, wherein the adjusting comprises individually adjusting birefringence of birefringence-controllable adjustable optical compensators of an array of birefringence-controllable adjustable optical compensators that make up the birefringence-controllable optical element.

19. The method of claim 15, further comprising:
controlling the adjusting birefringence of the birefringence-controllable optical element.

20. The method of claim 19, wherein the controlling comprises:
detecting illumination intensities of the linear polarized modified intensity light beam;
generating a control signal based on the detected illumination intensities; and
performing the adjusting step based on the control signal.

* * * * *